Oct. 2, 1951        L. L. GAGNON        2,570,106
OPHTHALMOLOGISTS' PLIERS
Filed April 4, 1947
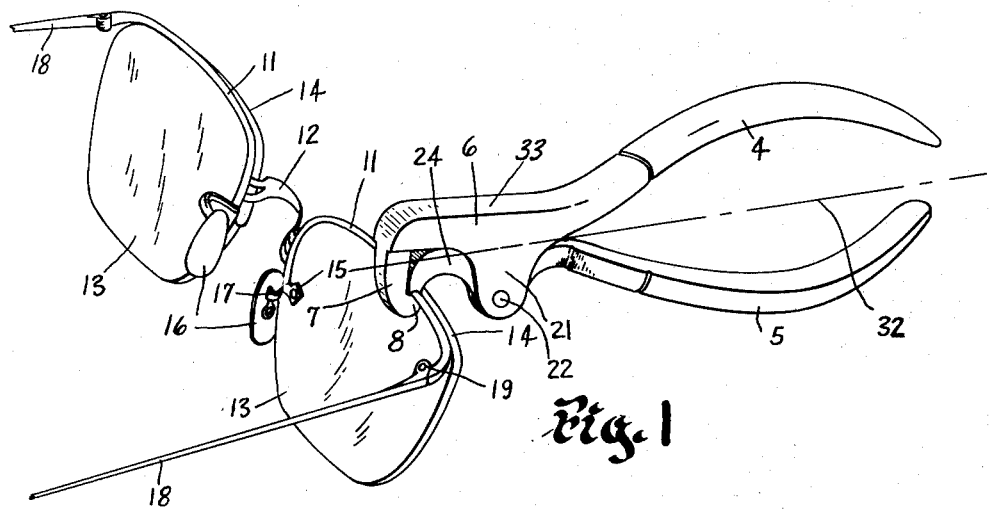
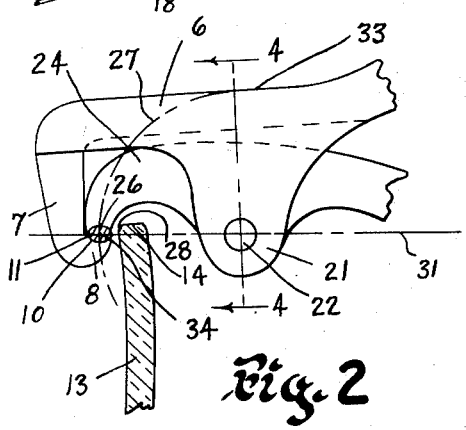
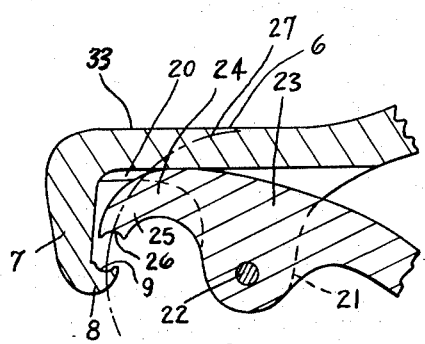
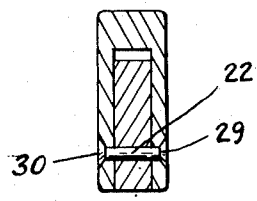
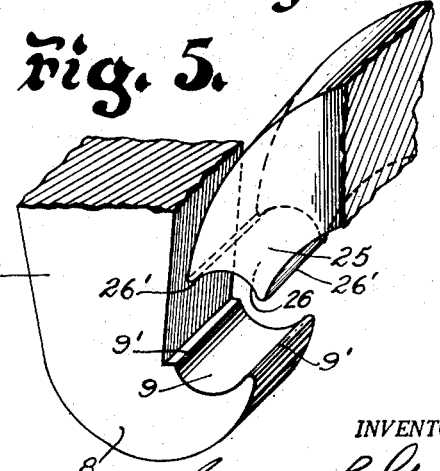
INVENTOR.
Louis L. Gagnon Patented Oct. 2, 1951

2,570,106

UNITED STATES PATENT OFFICE 2,570,106

OPHTHALMOLOGIST'S PLIERS

Louis L. Gagnon, Southbridge, Mass., assignor to American Optical Company, Southbridge, Mass., a voluntary association of Massachusetts Application April 4, 1947, Serial No. 739,331

2 Claims. (Cl. 81—3.6)

This invention relates to hand manipulated tools and relates more particularly to a plier for gripping and aiding in holding and adjusting the parts of an ophthalmic mounting.

One of the principal objects of the invention is to provide a pair of pliers for gripping and holding the parts of an ophthalmic mounting for aiding the proper adjustment of said parts while having a clear view of the parts being adjusted.

Another object is to provide a pair of pliers for use in adjusting the metallic supporting parts of an ophthalmic mounting of the type having a pair of lenses supported by a single bridge member and having long and slender metallic adjustable supporting arms shaped substantially to follow the upper contour shape of the lenses and to lie in the rear of the plane of the lenses whereby said long and slender arms may be gripped and held in a manner whereby the relation of the arm with the lenses may be clearly viewed and the adjustments accurately performed without danger of accidentally chipping or breaking the lenses when the arms are being gripped by the pliers.

Another object is to provide pliers of the above nature whose jaws will move relative to each other in such a manner that the said movement will be in an arc in a direction away from the edge of the lens rather than in an arc described in a direction of the edge of the lens.

Other objects and advantages of the invention will become apparent from the following description taken in connection with the accompanying claims. I, therefore, do not wish to be limited to the exact details of construction and arrangement of parts shown and described as the preferred form only has been given by way of illustration.

Referring to the drawings:

Fig. 1 is a perspective view of the device embodying the invention showing it associated with an ophthalmic mounting and its functional use in gripping and holding the supporting parts of the mounting;

Fig. 2 is an enlarged fragmentary side elevational view of the device shown in Fig. 1;

Fig. 3 is a view generally similar to Fig. 2 showing a longitudinal sectional view of the device;

Fig. 4 is a sectional view taken as on line 4—4 of Fig. 2; and

Fig. 5 is an enlarged fragmental view in perspective showing the cooperating transversely grooved end portions of the tool, in which the grooves are shaped between their side edges to firmly grip and hold an ophthalmic mounting for proper adjustment thereof.

Pliers of the character described for use in gripping the lens supporting parts of an ophthalmic mounting of the character shown and described are not new in the art. Such prior art pliers, however, had a jaw member in the form of a parrot nose which was adapted to be hooked onto the lens supporting structure and had another movable jaw member adapted to grip said lens supporting structure and retain it in gripping relation with the hooked type jaw portion. Such prior art devices, however, were so constructed that the movable jaw member swung in an arc in a direction transversely of the adjacent edge of the lens and, in many instances, would engage and chip or break the lens during the gripping action.

The present invention is designed to retain all of the desirable functional features of such prior art pliers while overcoming the above undesirable feature or arc of movement of the movable jaw portion by so constructing the pliers that the movable jaw portion moves in an arc in a direction away from the edge of the lens during the gripping of the lens supporting structure thereby eliminating the danger of accidentally breaking the adjacent edge of the lens and possible chipping of the lenses.

Referring to the drawing wherein like characters of reference designate like parts throughout the several views, the device embodying the invention comprises a pair of hand grip portions 4 and 5, one having an intermediate longitudinally extending portion 6 terminating in a jaw portion 7 extending outwardly to one side thereof substantially perpendicular to the said intermediate portion 6. The jaw portion 7 terminates in a hook-like end 8 having its inner surface cupped as illustrated at 9 in Fig. 3 to fit and intimately engage with the adjacent contour surface 10 of the temple supporting portion or bar member 11 of the lens supporting means of an ophthalmic mounting of the type shown in Fig. 1. This ophthalmic mounting embodies a bridge member 12 for retaining the lenses 13 in desired spaced relation with each other. The bridge member 12 has the long and slender temple supports 11 extending outwardly of the opposed sides thereof with each of said portions 11 shaped substantially to follow the shape of the upper contour edges 14 of the lenses 13. The lenses are secured to the supporting structure by means of the lens straps 15 of the conventional type and the mounting is provided with a pair of nose pads 16 carried by the adjustable pad arms 17 of the conventional type.

The long and slender temple supporting bars 11 to which the temples 18 are pivotally connected as illustrated at 19 are adapted to lie in the rear of the plane of the lenses as shown best in Fig. 2. The said long and slender temple supporting bars 11 are formed to a definite cross-sectional shape. The inner surface 9 of the hooked end 8 of the jaw 7 is shaped to the dimension of the surface of the bar member with which it is adapted to engage, preferably the undersurface as illustrated in Fig. 2. The intermediate portion 6 is of a thickness greater than the thickness of the jaw 7, as shown best in Fig. 1, and is provided with an internal longitudinal slot or channel 20 having perforated wing-like portions 21 formed integrally with the side walls thereof and lying in spaced relation with each other. Between the said wing-like portions 21, there is pivotally connected by means of the pivot pin or the like 22 an extension 23 on the other of said hand grip portions. The portion 23 terminates in a jaw 24 having an end portion 25 curving in a direction of the hook shaped end 8. The portion 25 terminates in a face 26 which is shaped to the upper contour shape of the arm 11, as shown best in Fig. 2. The longitudinal slot or channel 20 provides a clearance whereby the jaw 24 may be moved in a direction away from the hooked end 8 whereby said hooked end may be placed in gripping relation with the arm 11 and the jaw 24 may thereafter be moved about the pivot pin 22 in a direction toward the hook shaped end 8. It is to be noted that the jaw 24 moves in an arc 27 in a direction away from the adjacent edge 28 of the lens. That is, it swings in an arc about said edge in its function in gripping the long and slender temple supporting arm 11. The pivot pin 22 is headed over, as illustrated at 29 and 30, to hold the parts in assembled relation with each other.

Although the gripping surfaces 9 and 26 respectively of the jaw members are shaped substantially to the upper and lower surface shapes of the long and slender temple supports which, in this instance, causes said surfaces to be of a shape simulating a section of a cylinder. The said gripping faces may be formed to any desired shape depending upon the shape of the member to be gripped and are designed to avoid defacing or marring the said member. As is shown in Figs. 1 and 5, the transversely arcuate gripping surfaces 9 and 26, between their side edges 9' and 26', extend transversely across the outer end portions of the jaw members in the form of oppositely disposed grooves.

The device enables viewing the mounting in the usual conventional manner for determining alignment and provides ease of adjustment of the mounting to fit the requirements of the individual for whom it is being made.

It is particularly pointed out that the horizontal axis of the pivot 22 is located on a line 31 which is substantially parallel with a longitudinal center line 32 extending between the gripping members 4 and 5, as shown in Fig. 1, or is substantially parallel with the intermediate portion 6 when line 31 intersects the member 11, when member 11 is in gripped relation between the gripping surfaces 9 and 26 of the device as shown in Fig. 2. This causes the jaws to have substantially uniform gripping pressure when engaged with the member 11, that is, the distance between the longitudinal edge 33 of the intermediate portion 6 and the center of the pivot pin 22 is substantially equal to the distance between said longitudinal edge 33 and the center 34 of the member 11 when the jaws are in gripping relation therewith. This relation of the parts enables the member 11 to be firmly gripped with no tendency to cause said member to roll relative to the gripping surfaces during said gripping action. The pressure contact of the jaws is along an arcuate line whose center is located at the center of the pivot pin 22 with the said member being gripped being positioned or located along a line radial with said center, that is, the longest dimension of the cross-sectional shape of the member 11 being gripped is radial with the center of the pivot 22, as best illustrated in Fig. 2, and the pressure of the respective jaws, when in gripping relation with said member, is in a direction substantially normal to said radial line and avoids any tendency to cause said member to roll relative to the engaging surfaces of the jaws during the gripping action.

As stated above, the gripping face 9 of the hook shaped end 8 is first positioned in engagement with the undersurface of the member 11 and the gripping surface 26 of the jaw 24 is then moved into engagement with the upper surface of said member 11, this movement being along the arcuate line 27 and about the center of the pivot pin 22 is substantially in the direction of the plane of the lens 13 rather than a sweeping action across the adjacent edge of the lens as with known prior art pliers designed for gripping the supporting structure of mountings of the nature disclosed herein. With applicant's pliers, therefore, there is less tendency of accidentally engaging the edge of the lens during the gripping action with the danger of chipping and breaking the lens.

From the foregoing description, it will be seen that simple, efficient and economical means have been provided for accomplishing all of the objects and advantages of the invention.

Having described my invention, I claim:

1. A device of the character described comprising a pair of longitudinal members each having a hand grip portion adjacent one end, a laterally extending portion adjacent their opposed end, and an intermediate portion for pivotal connection with the intermediate portion of the other member, one of said laterally extending portions having a side surface disposed substantially normal to the longitudinal axis of said member and terminating in a substantially normally disposed hook shaped end portion having a gripping surface facing said longitudinal axis, and the other of said laterally extending portions terminating in an end portion having a gripping surface facing the gripping surface of the hook shaped end, said gripping surfaces being in the form of oppositely disposed grooves, the opposed side edges of which are disposed adjacent the opposed sides of the end portions of the laterally extending portions so as to encompass substantially the entire width of said facing end portions, and with said groove-like gripping surfaces extending in a direction transversely of the longitudinal axis of said member and adapted to assume a substantially aligned relation when the said gripping surfaces are substantially in engaged relation, said groove-like gripping surface of the hook shaped end being in adjacent relation with said normally disposed side surface of the laterally extending portion whereby said side surface will function as means for substantially aligning said article with said gripping surface of the hook shaped end portion when the gripping surfaces are moved toward each other, and connection means pivotally connecting together the intermediate portions of said longitudinal members for movement of said members about an axis disposed substantially normal to and to lie on a line drawn substantially parallel to the abovementioned longitudinal axis and passing through the gripping surface of the hook shaped end portion and in spaced relation therewith.

2. A device of the character described comprising a pair of longitudinal members each having a hand grip portion adjacent one end and a pair of spaced laterally extending portions adjacent their opposed end comprising inner and outer laterally extending portions, the outer laterally extending portion of one of said members having the side surface thereof toward the inner laterally extending portion being disposed substantially normal to the longitudinal axis of said member, said outer laterally extending portion terminating in a hook shaped end portion turned inwardly from said side surface and toward the inner laterally extending portion to provide a gripping surface facing the longitudinal axis of said member, and the outer laterally extending portion of the other member terminating in an end portion having a gripping surface facing the gripping surface of the hook-shaped end, said gripping surfaces being in the form of oppositely disposed grooves, the opposed side edges of which are disposed adjacent the opposed sides of the end portions of the said outer laterally extending portions so as to encompass substantially the width of said facing end portions, and with said groove-like gripping surfaces extending in a direction transversely of the longitudinal axis of said member and adapted to assume a substantially aligned relation when the said gripping surfaces are substantially in engaged relation, said groove-like gripping surface of the hook shaped end being in adjacent relation with said normally disposed side surface of the laterally extending portion whereby said side surface will function as means for substantially aligning said article with the gripping surface of the hook shaped end when the gripping surfaces are moved toward each other, and connection means pivotally connecting together said inner laterally extending portions for movement of the longitudinal members about an axis disposed substantially normal to and to lie on a line drawn substantially parallel to the above mentioned longitudinal axis and passing through the gripping surface of the hook shaped end portion.

LOUIS L. GAGNON.

REFERENCES CITED

The following references are of record in the file of this patent:

UNITED STATES PATENTS

| Number | Name | Date |
|---|---|---|
| 1,428,029 | Hansen | Sept. 5, 1922 |
| 1,983,519 | Choate | Dec. 11, 1934 |
| 2,106,121 | Lorenzo | Jan. 18, 1938 |
| 2,301,445 | Ostertag et al. | Nov. 10, 1942 |